US012710156B2

(12) United States Patent
Chen

(10) Patent No.: US 12,710,156 B2
(45) Date of Patent: *Aug. 18, 2026

(54) INFLATABLE LIGHTING DEVICE

(71) Applicant: Ztarx Corporation Limited, Shenzhen (CN)

(72) Inventor: Songping Chen, Shenzhen (CN)

(73) Assignee: Ztarx Corporation Limited, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/234,264

(22) Filed: Jun. 10, 2025

(65) Prior Publication Data

US 2025/0305654 A1 Oct. 2, 2025

Related U.S. Application Data

(63) Continuation of application No. 18/827,905, filed on Sep. 9, 2024, now Pat. No. 12,352,424, which is a (Continued)

(30) Foreign Application Priority Data

Mar. 28, 2022 (CN) ......................... 202220709839.2

(51) Int. Cl.

| | |
|---|---|
| ***F21V 3/02*** | (2006.01) |
| ***A63H 27/10*** | (2006.01) |
| ***F21S 4/20*** | (2016.01) |
| ***F21S 4/24*** | (2016.01) |
| ***F21S 9/03*** | (2006.01) |
| ***F21V 21/08*** | (2006.01) |

(Continued)

(52) U.S. Cl.

CPC ................ *F21V 3/026* (2013.01); *F21S 4/20* (2016.01); *F21S 4/24* (2016.01); *F21S 9/035* (2013.01); *F21S 9/037* (2013.01); *F21V 3/023* (2013.01); *F21V 23/008* (2013.01); *F21V 23/009* (2013.01); *F21V 31/005* (2013.01); *A63H 2027/1058* (2013.01); *F21V 21/08* (2013.01); *F21V 21/096* (2013.01); *F21Y 2103/10* (2016.08); *F21Y 2115/10* (2016.08)

(58) Field of Classification Search

CPC .... F21V 3/026; F21S 4/24; F21S 4/22; F21Y 2103/10; A63H 2027/1058

See application file for complete search history.

(56) References Cited

U.S. PATENT DOCUMENTS

2008/0291681 A1* 11/2008 Appleton ................ F21V 3/026 362/307
2013/0187569 A1* 7/2013 Chin-Huan ......... F21V 23/0485 315/307

(Continued)

*Primary Examiner* — William N Harris

(57) ABSTRACT

An inflatable lighting device includes: a flexible housing, a light assembly, and a sealing assembly. The flexible housing defines a receiving cavity. The receiving cavity is inflatable, the flexible housing includes a first surface and a second surface. The light assembly is received in the receiving cavity, the light assembly includes a plurality of light elements and a light base, the plurality of light elements are arranged on the light base. The sealing assembly is received in the receiving cavity, the sealing assembly is connected to the inner side of the first surface. The light assembly is disposed between the sealing assembly and the first surface.

20 Claims, 14 Drawing Sheets

Related U.S. Application Data continuation of application No. 18/429,540, filed on Feb. 1, 2024, now Pat. No. 12,117,153, which is a continuation of application No. PCT/CN2022/136916, filed on Dec. 6, 2022.

(51) Int. Cl.

| | |
|---|---|
| ***F21V 21/096*** | (2006.01) |
| ***F21V 23/00*** | (2015.01) |
| ***F21V 31/00*** | (2006.01) |
| ***F21Y 103/10*** | (2016.01) |
| ***F21Y 115/10*** | (2016.01) |

(56) References Cited

U.S. PATENT DOCUMENTS

| | | | | |
|---|---|---|---|---|
| 2013/0335953 | A1* | 12/2013 | Gold | F21V 3/026 362/190 |
| 2014/0118997 | A1* | 5/2014 | Snyder | F21L 4/08 362/183 |
| 2015/0219294 | A1* | 8/2015 | Sreshta | F21V 23/005 362/96 |
| 2017/0067268 | A1* | 3/2017 | Tong | E04H 4/0025 |
| 2019/0120477 | A1* | 4/2019 | Yan | H05B 45/24 |
| 2020/0032982 | A1* | 1/2020 | Bastian | F21S 9/02 |
| 2024/0115907 | A1* | 4/2024 | Wolfinbarger | A63B 41/00 |

* cited by examiner

INFLATABLE LIGHTING DEVICE

CROSS REFERENCE TO RELATED APPLICATIONS

The present application is a continuation application of the U.S. patent application Ser. No. 18/827,905, filed on Sep. 9, 2024, which is a continuation of the U.S. patent application Ser. No. 18/429,540 filed on Feb. 1, 2024, now the U.S. Pat. No. 12,117,153 issued on Oct. 15, 2024, which is a continuation application of the international patent application No. PCT/CN2022/136916, filed on Dec. 6, 2022, which in turn claims priority of the Chinese patent application No. 202220709839.2, filed on Mar. 28, 2022. The contents of all of the aforementioned applications are incorporated by reference herein in their entirety.

TECHNICAL FIELD

The present disclosure relates to the field of lamps, and in particular to an inflatable lighting device.

BACKGROUND

There are various lamps currently on the market, but these lamps are not suitable for outdoor activities. Some lamps cannot be folded for storage and carriage; some lamps are too small in size, resulting in a poor light diffusion and a small illumination area; some lamps are not waterproof and cannot float on the water surface. Further, the existing inflatable lamps are designed to have a certain small size for carry, and the LED light sources in the existing inflatable lamps are rigid lamp panels. In order to expand the illumination area, the rigid lamp panels should be enlarged, which may cause the inflatable lamps are not convenient to carry.

SUMMARY OF THE DISCLOSURE

In view of the foregoing disadvantages inherent in the existing art, the general purpose of the present disclosure is to provide an inflatable lamp, to include all advantages of the existing art, and to overcome the drawbacks inherent in the existing art.

In a first aspect, the present disclosure provides an inflatable lighting device, including: a flexible housing, a light strip, and a sealing assembly. The flexible housing defines a receiving cavity. The receiving cavity is inflatable, the flexible housing includes a first surface and a second surface. The light strip is received in the receiving cavity, the light strip includes a plurality of light elements and a flexible base, the plurality of light elements are arranged on the flexible base. The sealing assembly is received in the receiving cavity, the sealing assembly is connected to the inner side of the first surface. The light strip is disposed between the sealing assembly and the first surface.

In the technical solution of the present disclosure, the inflatable lamp includes a flexible housing and a light strip, the flexible housing defines a receiving cavity, the receiving cavity is inflatable; the light strip is received in the receiving cavity, at least a portion of the light strip is flexible and attached on an inner side of the flexible housing. In this way, the light strip, are protected from being damaged, and the air in the receiving cavity may also be prevented from leaking. When in use, the air is filled into the receiving cavity to inflate the inflatable lamp. In an inflated state, the inflatable lamp may float on the water surface and emit light on the water surface; the light emitted by lamp beads of the light strip may be refracted and/or reflected in the receiving cavity, as such the inflatable lamp may generate a light which is soft, transparent, mellow, and uniform, to get a better lighting effect. Since the flexible housing, and the light strip are all flexible, the inflatable lamp may be folded or rolled for carry or store. User may adjust an inflating volume as needed to comfortably wear or use the inflatable light. In addition, the power supply assembly is electrically connected to the light strip to provide electricity for the light strip, so that the inflatable lamp does not need an external power supply, which is convenient for use.

BRIEF DESCRIPTION OF THE DRAWINGS

In order to more clearly illustrate the embodiments of the present disclosure or the technical solutions in the related art, the drawings to be used in the embodiments or description of the related art will be briefly described below. Obviously, the drawings in the following description are only certain embodiments of the present disclosure, and other drawings may be obtained according to the structures shown in the drawings without any creative work for a person having ordinary skill in the art.

DETAILED DESCRIPTION

Figure 1:
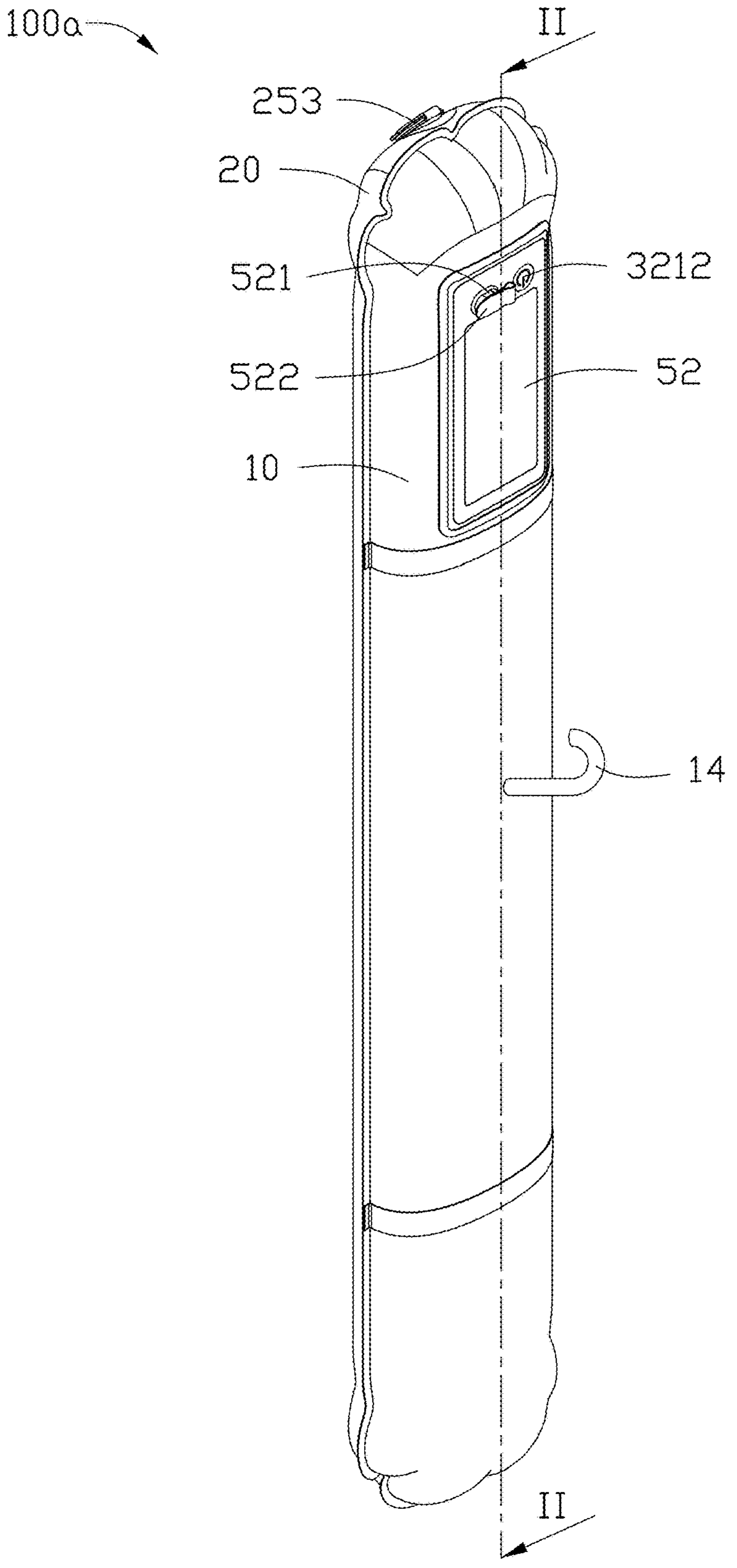
FIG. 1 is a structural schematic view of an inflatable lamp according to a first embodiment of the present disclosure.

The exemplary embodiments described herein detail for illustrative purposes are subject to many variations in implementation. The present disclosure provides a valve core assembly. It should be emphasized, however, that the present disclosure is not limited only to what is disclosed and extends to cover various alternation to valve core assembly. It is understood that various omissions and substitutions of equivalents are contemplated as circumstances may suggest or render expedient, but these are intended to cover the application or implementation without departing from the spirit or scope of the present disclosure.

It should be noted that all directional indications (such as up, down, left, right, front, rear, . . . ) in the embodiments of the present disclosure are only used to explain the relative position relationship, the movement, etc. between the components in a specific posture (as shown in the attached drawings). If the specific posture is changed, the directional indication will be changed accordingly.

In addition, the descriptions of "first", "second", etc., in this application are used for descriptive purposes only, and are not to be construed as indicating or implying their relative importance or implicitly indicating the number of technical features indicated. Thus, features defining "first" or "second" may include at least one of the features, either explicitly or implicitly. In addition, the technical solutions between the various embodiments of the present disclosure may be combined with each other, but must be based on the realization of a person having ordinary skill in the art, when the combination of technical solutions is contradictory or unrealizable, it shall be deemed that such combination of technical solutions does not exist and is not within the scope of this application.

Referring to FIGS. 1 to 11, the present disclosure provides an inflatable lamp 100*a* according to a first embodiment.

The inflatable lamp 100*s* includes: a first flexible housing 10, a second flexible housing 20, a power assembly 30 arranged on the first flexible housing 10, a lamp strip 40, and a sealing assembly 50. The second flexible housing 20 is connected with the first flexible housing 10 to cooperatively form a receiving cavity 12. The power supply 30 includes a mounting element 31 arranged on the first flexible housing 10, and a power supply 32 mounted in the mounting element 31. The lamp strip 40 is received in the receiving cavity 12. One end of the lamp strip 40 is arranged on the mounting element 31 and electrically connected with the power supply 32. The sealing assembly 50 includes a first sealing element 51 sealingly connected with an inner side of the first flexible housing 10, the first sealing element 51 is configured to airtightly seal and cover the lamp strip 40, the mounting element 31, and the power supply 32.

In at least one embodiment, the first flexible housing 10 is sealed with the second flexible housing 20. In detail, a peripheral of the first flexible housing 10 is sealed with a peripheral of the second flexible housing 20.

In at least one embodiment, the light strip 40 is an LED flexible light strip, and the flexible light strip 40 may be bent or even curled.

It should be understood that the first flexible housing 10, the second flexible housing 20, and the light strip 40 may all be bent, and the inflatable lamp 100*a* in a deflated state may be rolled up for storage and carriage.

In at least one embodiment, the light strip 40 includes a plurality of lamp beads (not labeled) connected in series, and the lamp beads may emit white light or color light. The lamp beads may be LED chips.

It should be understood that the inflatable lamp 100*a* may be installed on tents, carriages, etc., and the inflatable lamp 100*a* may also be fixed to surfaces of other objects (such as, backpacks, sunshades, clothes, or inflatable toys, etc.). Since the inflatable lamp 100*a* may be rolled up, the inflatable lamp 100*a* may still fit well on the uneven surfaces of the objects.

In at least one embodiment, the first flexible housing 10 has a first cavity 11, and the second flexible housing 20 has a second cavity 21. After the first flexible housing 10 are sealed with the second flexible housing 20, the first cavity 11 and the second cavity 21 cooperatively form the receiving cavity 12.

In at least one embodiment, the first flexible housing 10 and the second flexible housing 20 are matched in shape, and the peripheral of the first flexible housing 10 is sealed with the peripheral of the second flexible housing 20. So that, the inflatable lamp 100*a* is waterproof.

In at least one embodiment, the first flexible housing 10 and/or the second flexible housing 20 has a sucking cup, hook and loop fasteners, a buckle structure (including a buckle head and a buckle seat), or a hook, etc. The inflatable lamp 100*a* may be worn on the human body, attached to the surface of the object, or hung on the object.

In at least one embodiment, the first flexible housing 10 and the second flexible housing 20 are both made of transparent or translucent materials, such as thermoplastic polyurethane (TPU), polyvinyl chloride (PVC), and so on. The first flexible housing 10 may be sealed with the second flexible housing 20 by heat pressing, hot electric pressing, or welding.

In at least one embodiment, peripheries of the power supply assembly 30, the first flexible housing 10, and the second flexible housing 20 are all coated with sealant, so as to obtain a sealed receiving cavity 12.

In at least one embodiment, the first sealing element 51 is made of transparent or translucent materials, such as thermoplastic polyurethane (TPU), polyvinyl chloride (PVC), and so on. The first sealing member 51 is configured to protect the light strip 40, the mounting element 31, and the power supply element 32 from damage, and to separate the receiving cavity 12 from the light strip 40, the mounting element 31, and the power supply element 32, so as to prevent an air leakage.

In at least one embodiment, since masses of the first flexible housing 10, the second flexible housing 20, the power supply assembly 30, the light strip 40, and the sealing assembly 50 are all small, the inflatable lamp 100*a* is easy to carry.

The first flexible housing 10, the second flexible housing 20, and the light strip 40 are all elongated, lengths and widths of first flexible housing 10, the second flexible housing 20, and the light strip 40 may be adjusted according to actual needs to obtain a larger illumination area.

In at least one embodiment, the inflatable lamp 100*a* in the deflated state has a length of 60 cm to 100 cm, and a width of 5 cm to 15 cm; the inflatable lamp 100*a* in the inflated state has a length of 60 cm to 100 cm, and a diameter of 7 cm to 17 cm.

In at least one embodiment, the power supply element 32 includes a solar panel 321 and a battery 322, and the solar panel 321 and the battery 322 are received in the mounting element 31. Electrical energy generated by the solar panel 321 may be stored in the battery 322.

In at least one embodiment, the mounting element 31 is made of rigid plastic.

In the technical solution of the present disclosure, the inflatable lamp 100*a* includes a first flexible housing 10, a second flexible housing 20, a power supply assembly 30, a light strip 40, and a sealing assembly 50. The second flexible housing 20 is connected with the first flexible housing 10 to form the receiving cavity 12. The power supply assembly 30 is arranged on the first flexible housing 10. The power supply assembly 30 includes a mounting element 31 and a power supply 32, the mounting element 31 is arranged on the first flexible housing 10, and the power supply 32 is received in the mounting element 31. The light strip 40 is received in the receiving cavity 12, and the end of the light strip 40 is arranged on the mounting element 31 and electrically connected with the power supply 32. The sealing assembly 50 includes a first sealing element 51 sealingly connected to an inner side of the first flexible housing 10, and the first sealing element 51 is configured to airtightly seal and cover the light strip 40, the mounting member 31, and the power supply member 32. Both the power supply assembly 30 and the light strip 40 are received in the receiving cavity 12, and the first sealing member 51 is configured to airtightly seal and cover the power supply assembly 30 and the light strip 40. In this way, the light strip 40, the mounting member 31, and the power supply member 32 are protected from being damaged, and the air in the receiving cavity 12 may also be prevented from leaking.

When in use, the air is filled into the receiving cavity 12 to inflate the inflatable lamp 100*a*. In an inflated state, the inflatable lamp 100*a* may float on the water surface and emit light on the water surface; the light emitted by the lamp beads of the light strip 40 may be refracted and/or reflected in the receiving cavity 12, as such the inflatable lamp 100*a* may generate a light which is soft, transparent, mellow, and uniform, to get a better lighting effect. Since the first flexible housing 10, the second flexible housing 20, and the light strip 40 are all flexible, the inflatable lamp 100*a* may be folded or rolled for carry or store. User may adjust the inflating volume as needed to comfortably wear or use the inflatable light 100*a*. In addition, the power supply 32 of the power supply assembly 30 is electrically connected to the light strip 40 to provide electricity for the light strip 40, so that the inflatable lamp 100*a* does not need an external power supply, which is convenient for use.

The first sealing element 51 includes a first sealing part 511 and a second sealing part 512 connected to the first sealing part 511. The first sealing part 511 is configured to airtightly seal the mounting element 31 and the power supply 32 between the inner side of the first flexible housing 10 and the first sealing part 511, the second sealing part 512 is configured to airtightly seal the light strip 40 between the inner side of the first flexible housing 10 and the second sealing part 512.

In at least one embodiment, the second sealing part 512 is matched with the mounting element 31 in shape.

In at least one embodiment, the second sealing part 512 is matched with the light strip 40 in shape.

In at least one embodiment, the first sealing part 511 is sealed with the second sealing part 512.

In the technical solution of the present disclosure, the first sealing part 511 is configured to airtightly seal the mounting element 31 and the power supply 32 between the inner side of the first flexible housing 10 and the first sealing part 511, the second sealing part 512 is configured to airtightly seal the light strip 40 between the inner side of the first flexible housing 10 and the second sealing part 512. In this way, the first sealing part 511 and the second sealing part 512 can not only protect the light strip 40, the mounting element 31, and the power supply 32 from being damaged, but also prevent the air in the receiving cavity 12 from leaking out.

One end of the light strip 40 is disposed on a surface of the mounting member 31 opposite to the solar panel 321, and electrically connected with the solar panel 321. The mounting element 31 is at least partially transparent.

In at least one embodiment, one end of the mounting element 31 defines a notch 311, and the solar panel 321 is exposed from the notch 311. The end of the light strip 40 is arranged on the surface of the mounting member 31 opposite to the solar panel 321, and electrically connected to the solar panel 321 through the notch 311.

In at least one embodiment, the end of the light strip 40 is arranged on the surface of the mounting element 31 opposite to the solar panel 321, and bent and extended along one end of the mounting element 31, to electrically connect to the solar panel 321.

In at least one embodiment, the light strip 40 is adhered to the surface of the mounting element 31 opposite away the solar power panel 321 by an adhesive.

In the technical solution of the present disclosure, the end of the light strip 40 is disposed on the surface of the mounting member 31 opposite to the solar panel 321, and electrically connected with the solar panel 321, and the mounting element 31 is at least partially transparent. So that, the illumination area of the inflatable lamp 100*a* is expanded.

The light strip 40 includes a body 41 and a connecting end 42 connected with the body 41. The connecting end 42 of the light strip 40 is arranged on the surface of the mounting element 31 opposite to the solar panel 321 and electrically connected with the solar panel 321.

In at least one embodiment, the connecting end 42 is arranged on the surface of the mounting element 31 opposite to the solar panel 321, and electrically connected with the solar panel 321 through the notch 311.

In at least one embodiment, the connecting end 42 is arranged on the surface of the mounting element 31 opposite to the solar panel 321, and extended and bent along an end of the mounting element 31, until the connecting end 42 is connected with the solar panel 321.

In at least one embodiment, the body 41 and the connecting end 42 both include a plurality of light beads.

The first flexible housing 10 has a mounting hole 13, the mounting element 31 is arranged on a portion of the first flexible housing 10 corresponding to the mounting hole 13, and received in the receiving cavity 12. The sealing assembly 50 further includes a second sealing element 52 facing the first sealing element 51. The second sealing element 52 is configured to sealingly connect with the first flexible housing 10, and airtightly seal and cover the mounting element 31 and the power supply 32.

In at least one embodiment, the second sealing element 52 is made of transparent or translucent materials, such as thermoplastic polyurethane (TPU), polyvinyl chloride (PVC), and so on.

In at least one embodiment, a peripheral of the second sealing element 52 is sealingly connected with a peripheral of the first sealing element 51.

In at least one embodiment, after the first sealing part 511 is sealed with the second sealing part 512, the mounting element 31 and the power supply 32 may be arranged on the first sealing part 511, the light strip 40 may be arranged on the second sealing part 512, and the second sealing element 52 may be placed on the inner side of the first flexible housing 10. Then the first sealing element 51 and the second sealing element 52 are subjected to a sealing process such as heat pressing, hot electric pressing, or welding. In this way, the peripheral of the first sealing element 51 is sealed with the peripheral of the second sealing element 52, and the second sealing element 52 is sealed with a peripheral of the mounting hole 13.

In at least one embodiment, after the first sealing part 511 is sealed with the second sealing part 512, the mounting element 31 and the power supply 32 may be arranged on the first sealing part 511, the light strip 40 may be arranged on the second sealing part 512, and the second sealing element 52 may be placed on an outer side of the first flexible housing 10. Then the first sealing element 51 and the second sealing element 52 are subjected to the sealing process. In this way, the peripheral of the first sealing element 51 is sealed with the inner side of the first flexible housing 10, and the peripheral of the second sealing element 52 is sealed with the outer side of the first flexible housing 10.

In at least one embodiment, when the first sealing element 51 is sealed with the second sealing element 52, a connecting area 5111 of the first sealing part 511 and the second sealing part 512 is not subjected to the sealing process, so as to prevent the light strip 40 in the connecting area 5111 from being damaged.

In at least one embodiment, when the second sealing part 512 is sealed with the second sealing part 512, a connecting edge 5121 is formed on the inner side of the first flexible housing 10.

In at least one embodiment, the first sealing element 51, the second sealing element 52, and the inner side of the first flexible housing 10 cooperatively form an accommodating cavity 15, and the mounting element 31, the power supply 32, and the light strip 40 are accommodated in the accommodating cavity 15.

In at least one embodiment, the first sealing part 511 and/or the second sealing part 512 defines at least one through hole, the through hole is configured to communicate the accommodating cavity 15 with the receiving cavity 12.

In at least one embodiment, at least a part of a light receiving surface of the solar panel 321 is exposed from the mounting hole 13, so that the solar panel 321 can absorb light.

In at least one embodiment, the second sealing element 52 is received in the mounting hole 13 or covers the mounting hole 13, to airtightly seal and cover the power supply 32 and the mounting element 31.

The mounting element 31 has a receiving groove, and both the solar panel 321 and the battery 322 are received in the receiving groove.

In at least one embodiment, the mounting element 31 defines a first receiving groove 312, and the battery 322 is received in the first receiving groove 312. The mounting element 31 further defines a second receiving groove 313 communicated with the first receiving groove 312. The second receiving groove 313 is formed by recessing two opposite side walls of the first receiving groove 312 in the opposite directions. The solar panel 321 is received in the second receiving groove 313.

In at least one embodiment, the first sealing part 511 defines a first accommodating groove 5112 and a second accommodating groove 5113 communicated with the first accommodating groove 5112. The second accommodating groove 5113 is formed by recessing two opposite side walls of the first accommodating groove 5112 in opposite directions. Walls of the first receiving groove 312 are accommodated in the first accommodating groove 5112, and walls of the second receiving groove 313 re accommodated in the second accommodating groove 5113.

In at least one embodiment, a surface of the mounting element 31 away from the first sealing element 51 defines the first receiving groove 312 and the second receiving groove 313.

The inflatable lamp **100*a* further includes at least one magnetic mounting component 16 mounted on the inner side of the first flexible housing 10 or the inner side of the second flexible housing 20**.

In at least one embodiment, the inflatable lamp **100*a* further includes at least one magnetic mounting component 16 and at least one coating film 17 configured to seal the at least one magnetic mounting component 16. The at least one coating film 17 is configured to seal the at least one magnetic mounting component 16 on the inner side of the first flexible housing 10 or the inner side of the second flexible housing 20. The at least one magnetic mounting component 16 may absorb a metal piece (not shown), for fixing the inflatable lamp 100*a*** on the metal piece.

Preferably, the at least one magnetic mounting component 16 includes at least two magnetic mounting components 16, the at least two magnetic mounting components 16 are arranged at intervals along an extension direction of the light strip 40 and between the light strip 40 and the first flexible housing 10.

Figure 2:
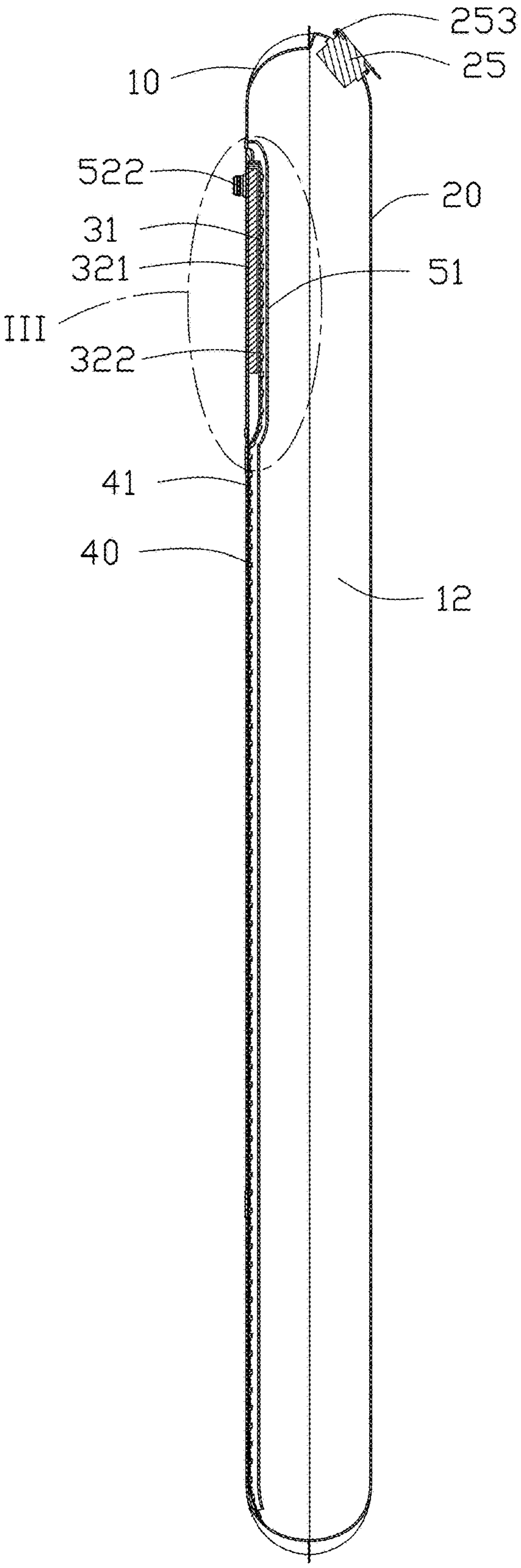
FIG. 2 is a cross-sectional view of the inflatable lamp of FIG. 1 along II-II line.
Figure 3:
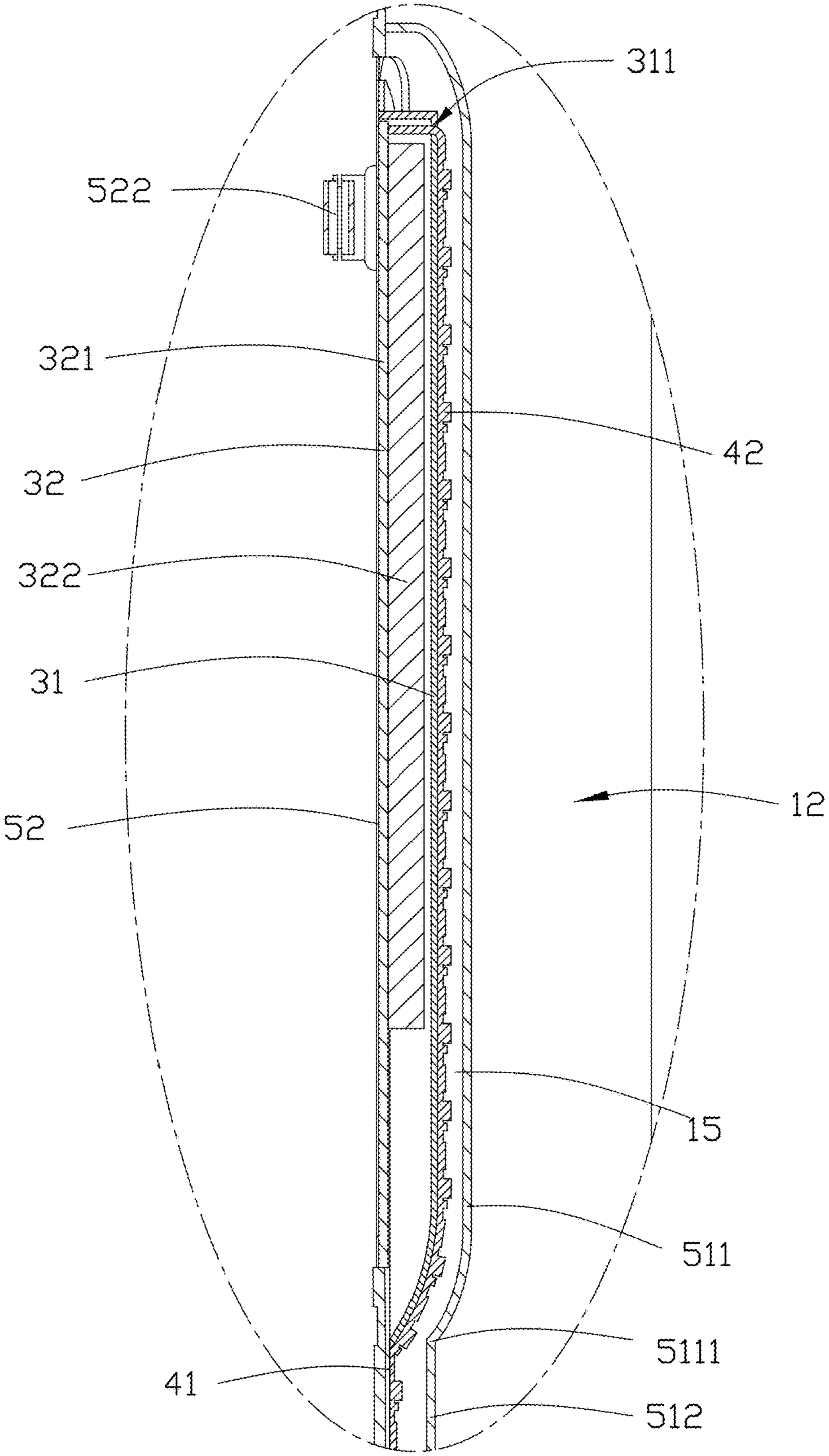
FIG. 3 is an enlarged view of a portion III in FIG. 2.
Figure 4:
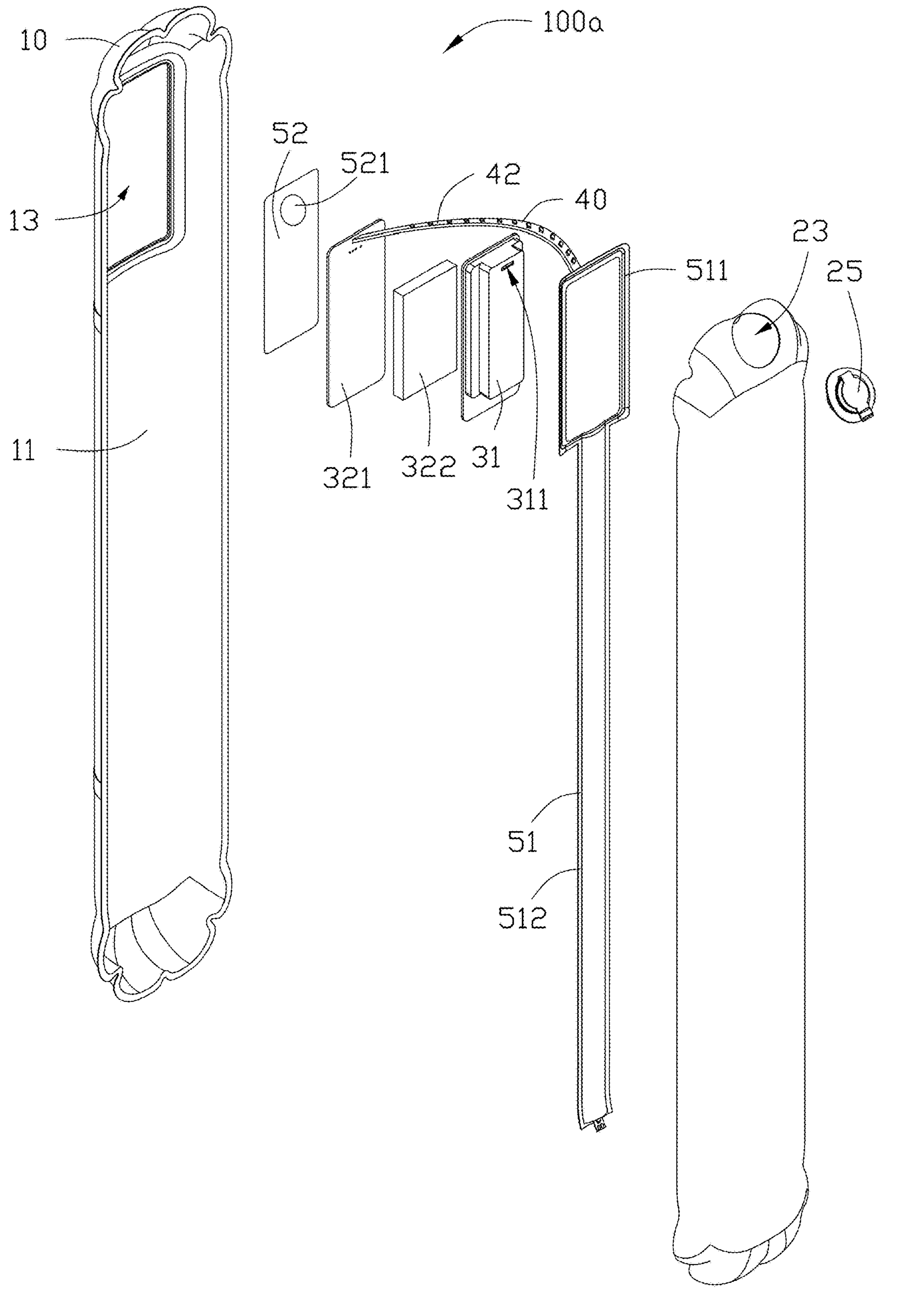
FIG. 4 is an exploded view of the inflatable lamp of FIG. 1.

Referring to FIGS. 2 to 3, a light-emitting surface of the light strip 40 is attached on the inner side of the first flexible housing 10.

It should be understood that the first flexible housing 10 is made of transparent or translucent materials, such as TPU or PVC. So that, the light from the light strip 40 may be emitted from the first flexible housing 10.

Referring to FIGS. 1 to 5, the first flexible housing 10 and/or the second flexible housing 20 defines at least one vent hole 23, the inflatable lamp **100*a* further includes at least one sealing plug 25 configured to open or airtightly seal the through hole 23**.

In at least one embodiment, the sealing plug 25 has a through hole 251 configured for charging and discharging air.

In at least one embodiment, the sealing plug 25 also includes a cover 253 rotatably connected with a periphery of the through hole 251, to seal the receiving cavity 12.

In at least one embodiment, the sealing plug 25 is a press-type air tap configured to prevent the air in the receiving cavity 12 from leakage.

In the technical solution of the present disclosure, the first flexible housing 10 and/or the second flexible housing 20 defines at least one vent hole 23. The inflatable lamp **100*a* further includes at least one sealing plug 25 configured to open or airtightly seal the through hole 23**, to charge and discharge air.

Figure 5:
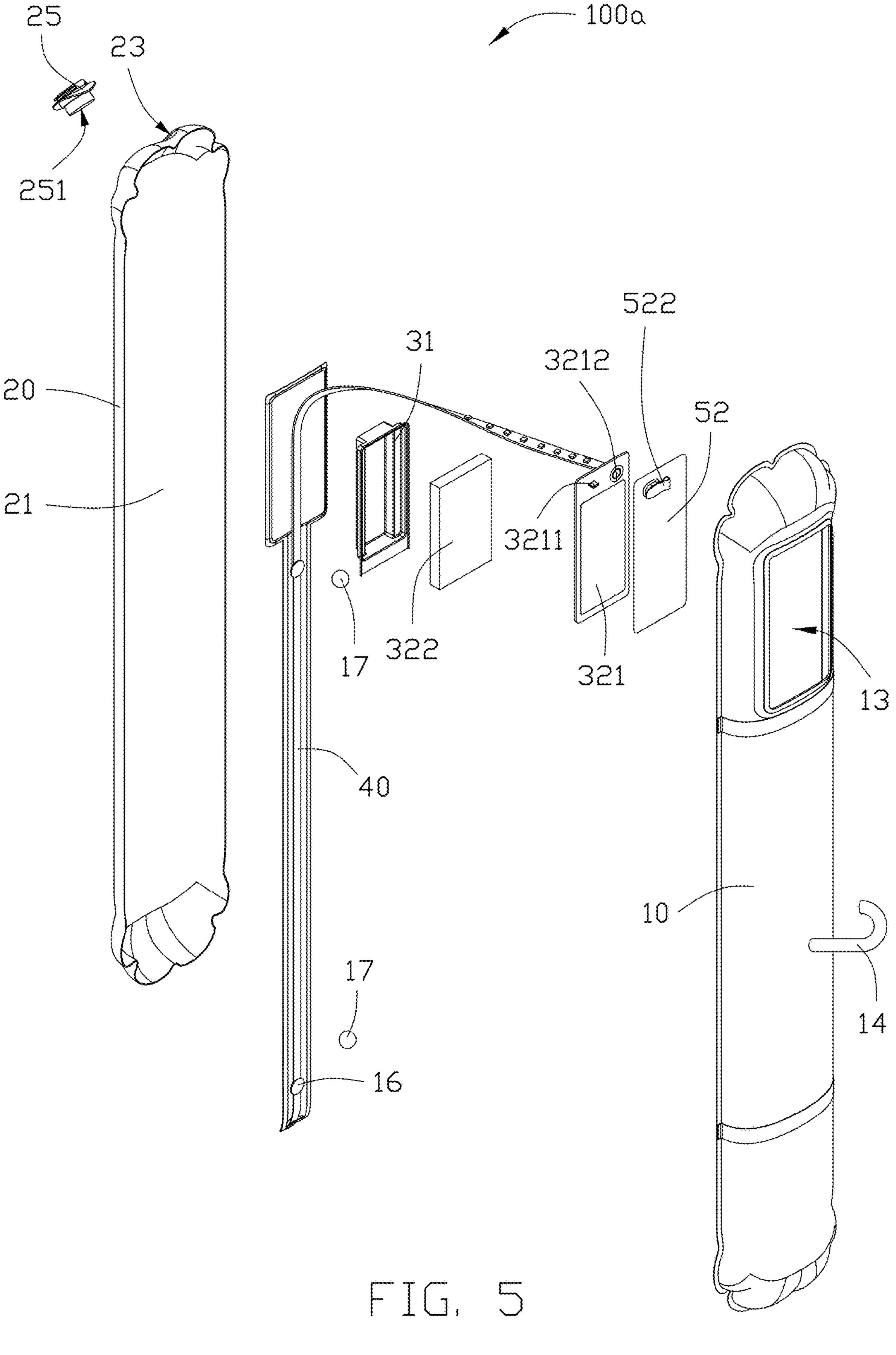
FIG. 5 is similar to FIG. 4, but shown from another view.
Figure 6:
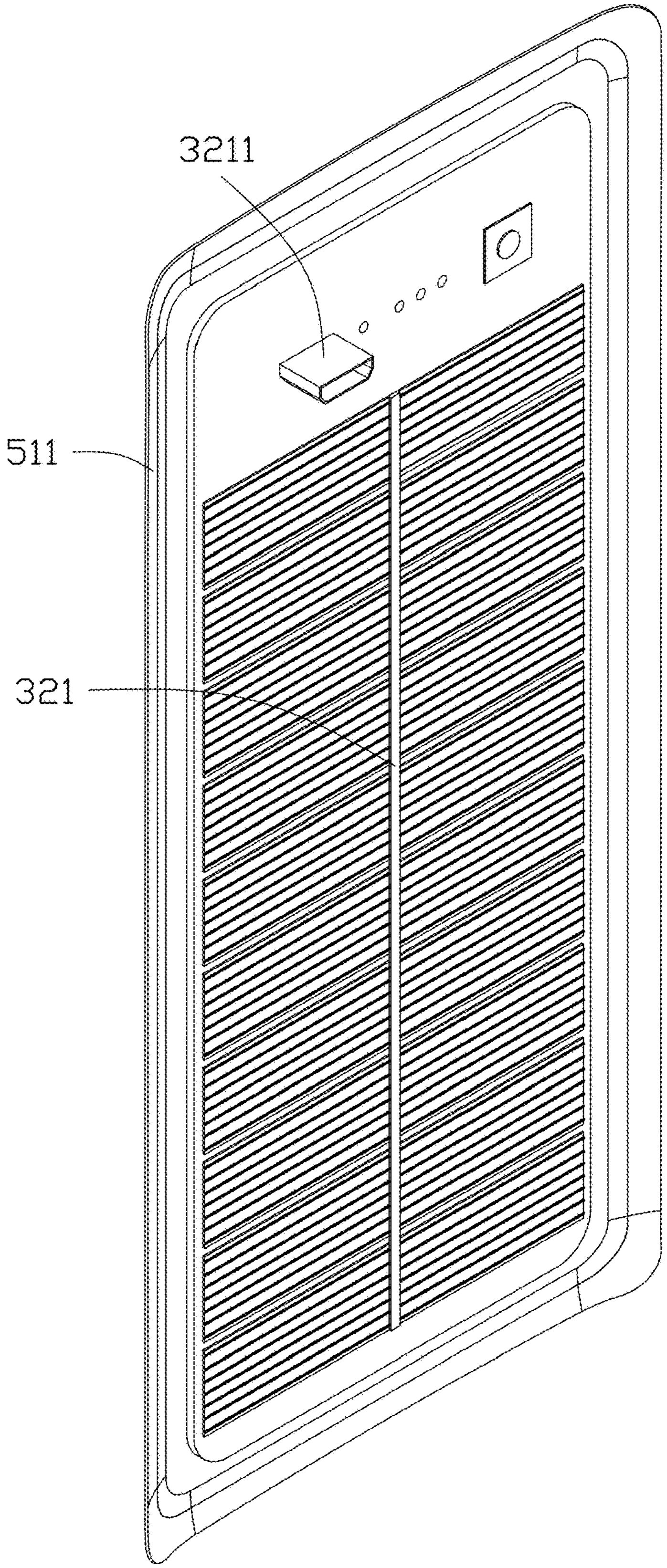
FIG. 6 is a structural schematic view of parts of a power supply assembly of the inflatable lamp of FIG. 1.
Figure 7:
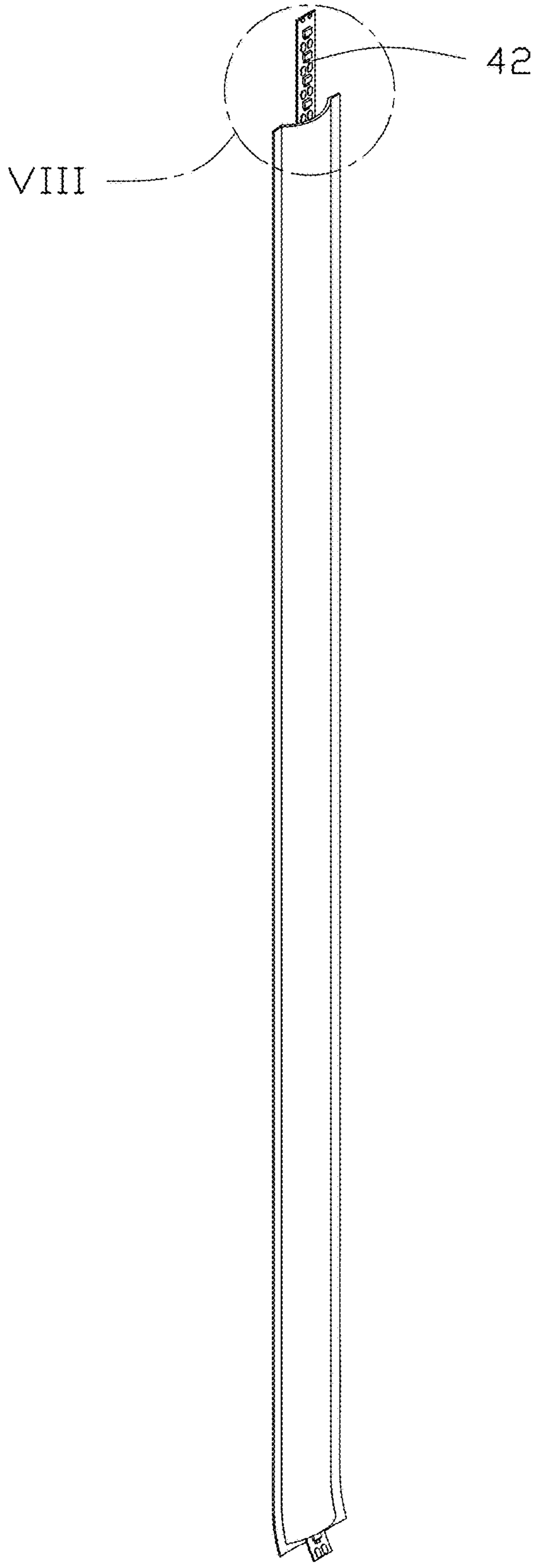
FIG. 7 is a structural schematic view of a light strip and a second sealing part of the inflatable lamp of FIG. 1.
Figure 8:
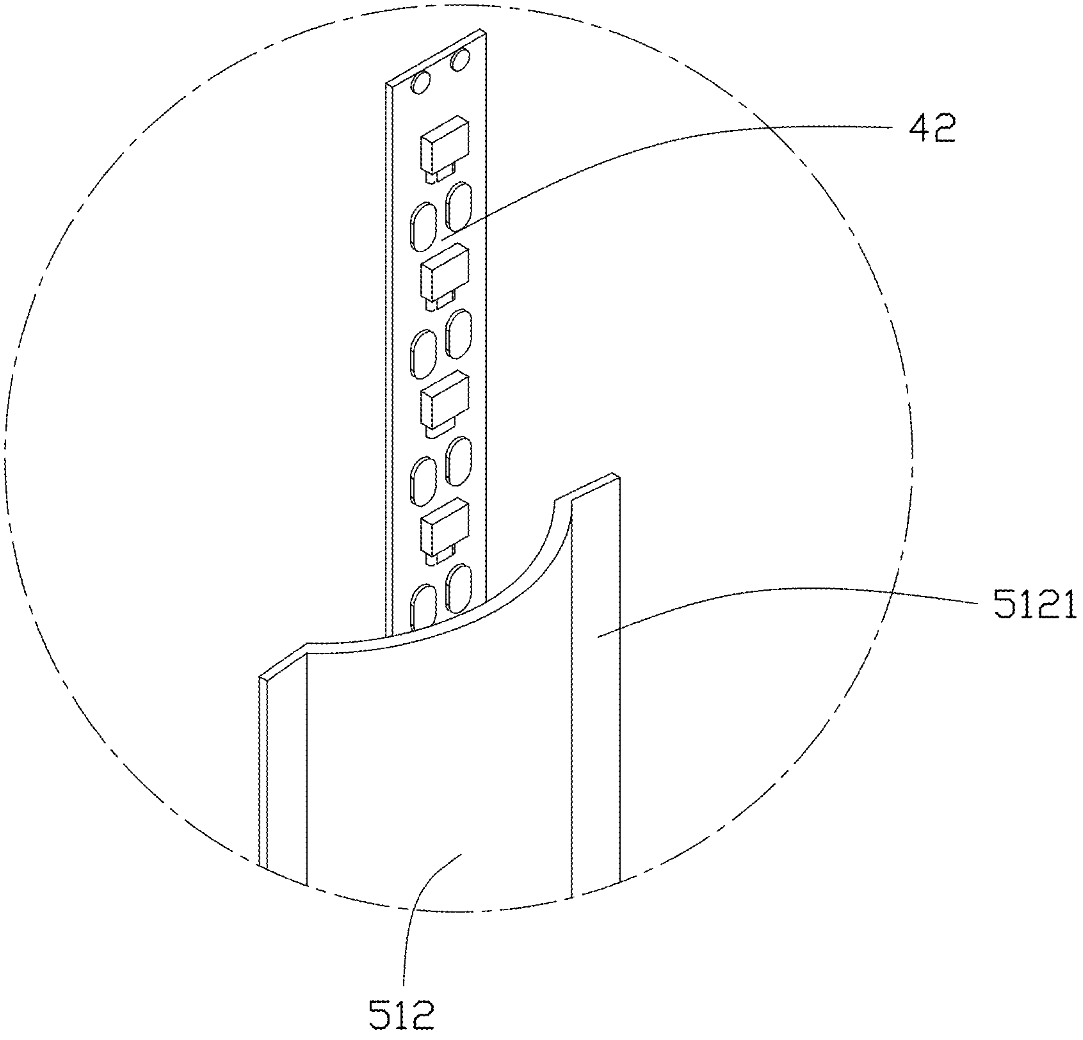
FIG. 8 is an enlarged view of a portion VIII in FIG. 7.
Figure 9:
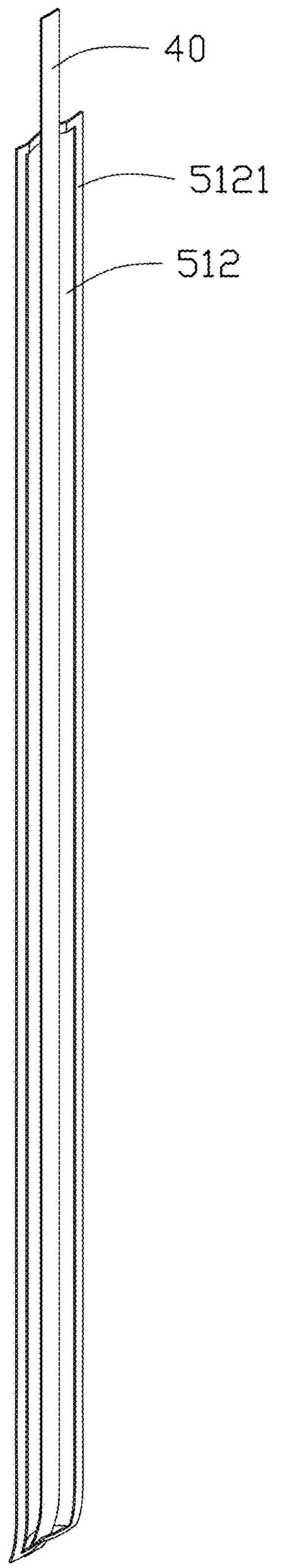
FIG. 9 is similar to FIG. 7, but shown from another view.
Figure 10:
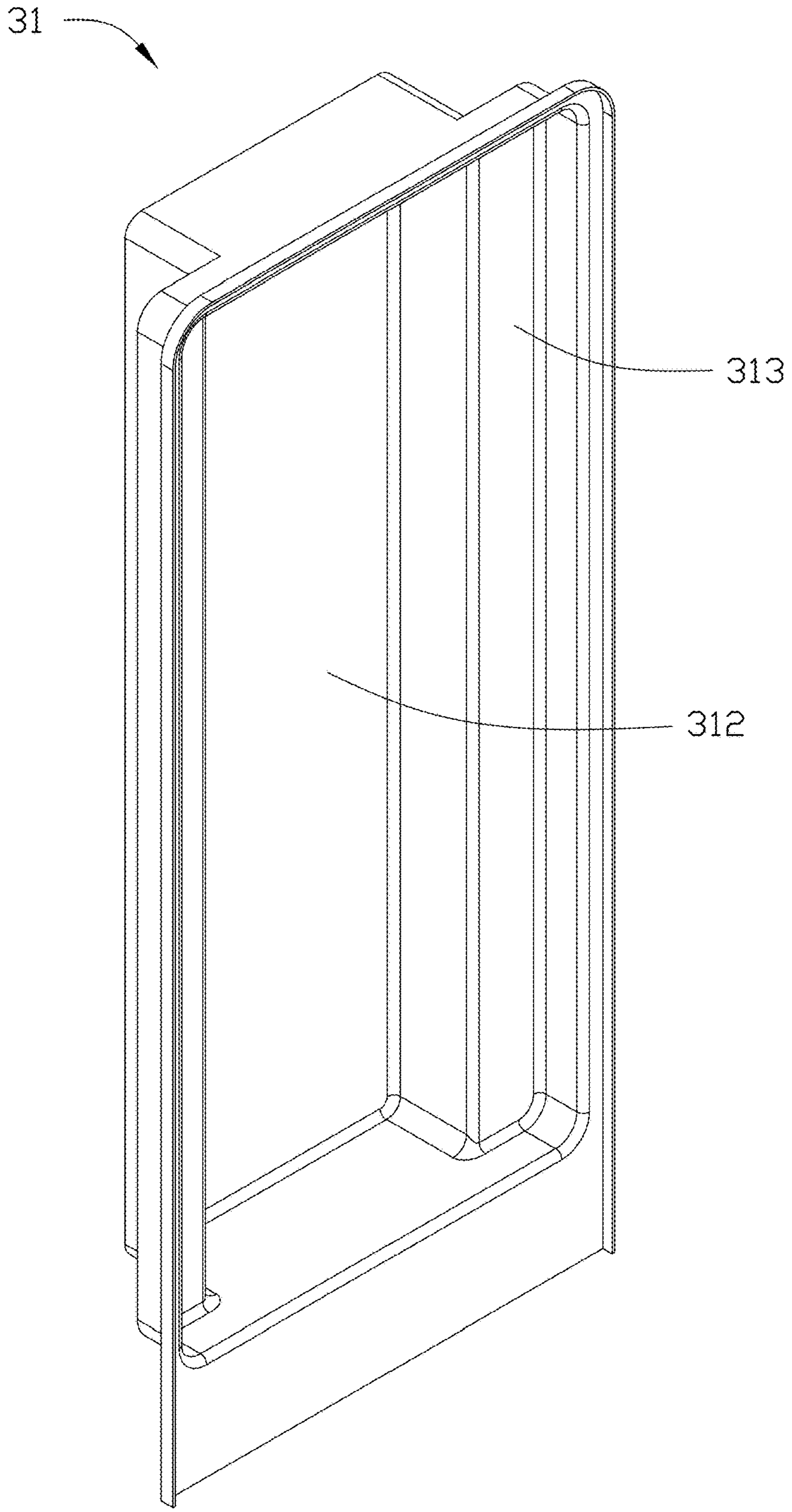
FIG. 10 is a structural schematic view of a mounting element of the inflatable lamp of FIG. 1.
Figure 11:
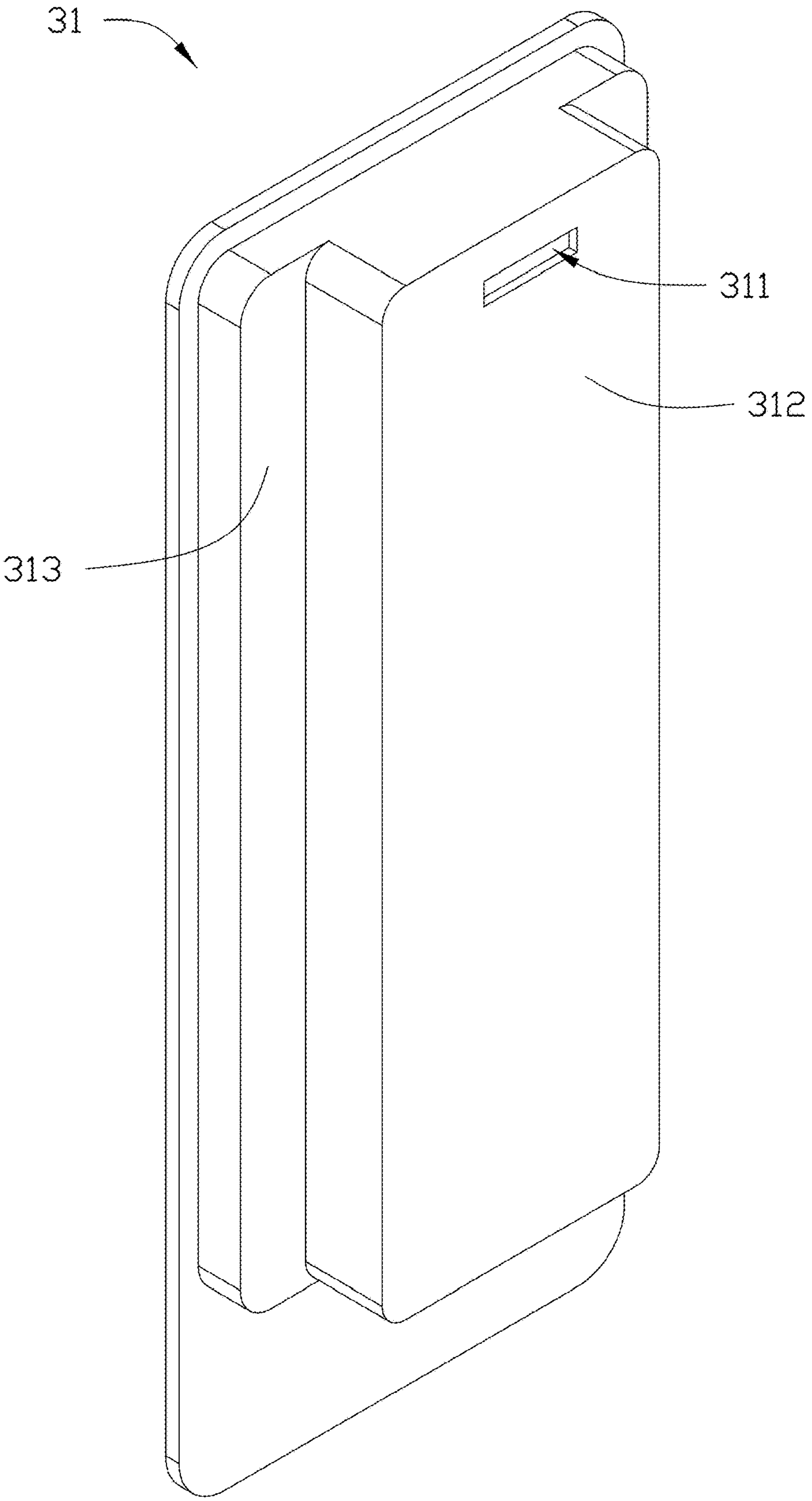
FIG. 11 is similar to FIG. 10, but shown from another view.

Referring to FIGS. 1 and 5, an outer surface of the first flexible housing 10 or an outer surface of the second flexible housing 20 includes at least one hanger 14.

In at least one embodiment, the outer surface of the first flexible housing 10 or the outer surface of the second flexible housing 20 includes a plurality of hangers 14.

In at least one embodiment, both ends of the first flexible housing 10 or both ends of the second flexible housing 20 include the hangers 14.

In the technical solution of the present disclosure, the outer surface of the first flexible housing 10 or the outer surface of the second flexible housing 20 includes at least one hanger 14, so as to hang the inflatable lamp **100*a*** on a fixed object.

The solar panel 321 includes a USB interface 3211, the second sealing element 52 includes an opening 521, the USB interface 3211 is exposed from the opening 521, and the USB interface 3211 is sealingly connected with a hole wall of the opening 521.

In at least one embodiment, the second sealing element 52 further includes a sealing plug 522, the sealing plug 522 is configured to expose or cover the USB interface 3211.

It should be understood that the USB interface 3211 may be connected with an external power supply, to supply power to the light strip 40. Meanwhile, the solar panel 321 may also be configured to charge terminal devices such as mobile phones through the USB interface 3211.

In at least one embodiment, the solar panel 321 further includes a switch 3212, and the switch 3212 is configured to turn on or turn off the light strip 40.

In at least one embodiment, the solar panel 321 further includes a control circuit (not shown), the control circuit may be wirelessly connected with a mobile terminal through Bluetooth and support a remote control of the mobile terminal. The control circuit board may also be configured to change light modes of the light strip 40.

In at least one embodiment, the solar panel 321 further includes a sound player (not shown) such as a speaker. After the control circuit is connected with a remote terminal through Bluetooth, the sound player may play sound or music.

In at least one embodiment, the light strip 40 may be turned on or turned off by pressing or touching the switch 3212. The light emitting color of the light strip 40 may also be changed by pressing or touching the switch 3212*l*.

Figure 12:
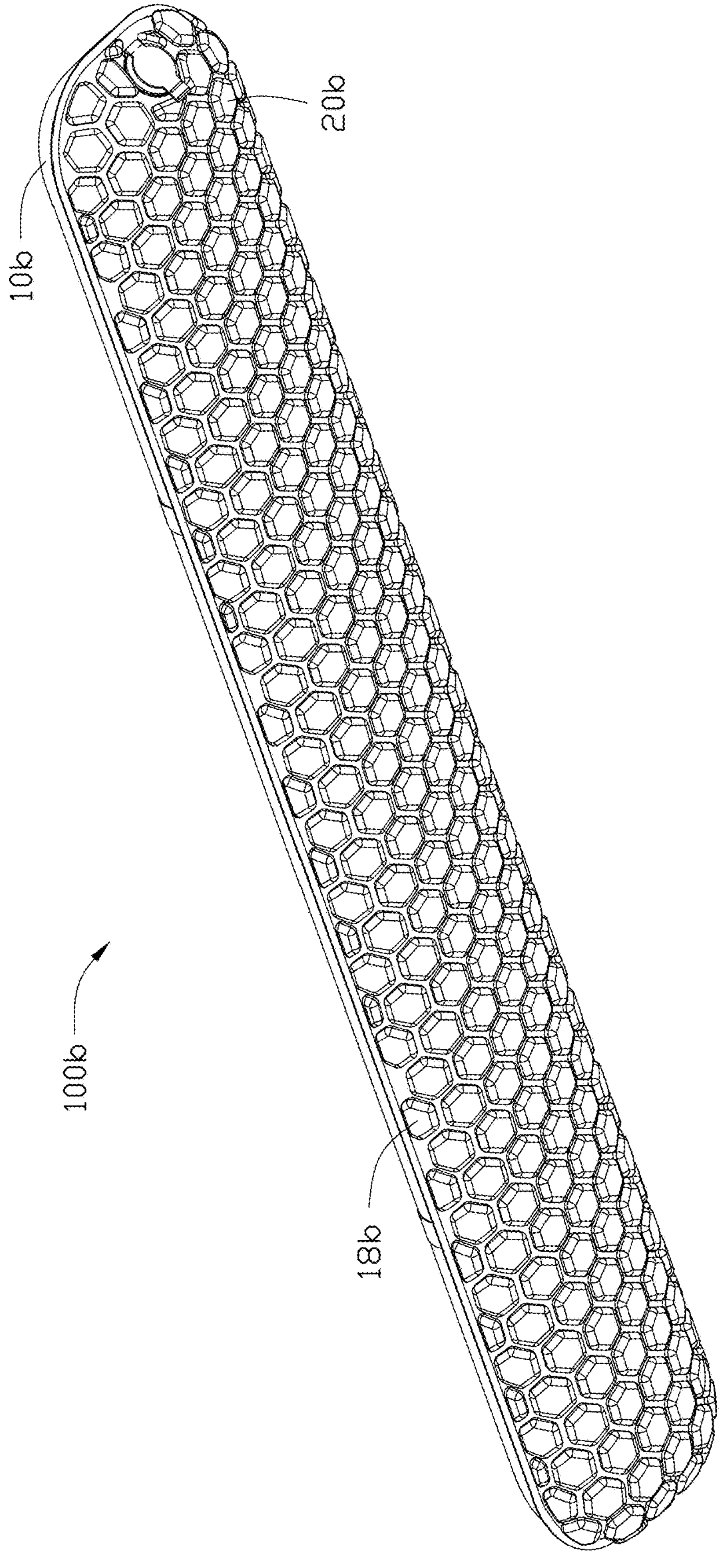
FIG. 12 is a structural schematic view of an inflatable lamp according to a second embodiment of the present disclosure.

Referring to FIG. 12, the present disclosure provides an inflatable lamp 100*b* according to a second embodiment. The inflatable lamp 100*b* of the second embodiment is similar in structure to the inflatable lamp 100*a* of the first embodiment, and the difference between the inflatable lamp 100*b* of the second embodiment and the inflatable lamp 100*a* of the first embodiment includes: an outer surface of the first flexible housing 10*b* and/or an outer surface of the second flexible housing 20*b* includes at least one light guiding element 18*b* configured to guide light. The light guiding elements 18*b* with different structures may be applied on the outer surface of the first flexible housing 10*b* and/or the outer surface of the second flexible housing 20*b* according to the scenarios, to condense or diffuse the light, so as to narrow or expand the illumination area.

In at least one embodiment, the light guiding element 18*b* is flexible.

In at least one embodiment, the light guiding element 18*b* is pre-filled with air.

In at least one embodiment, each light guiding element 18*b* defines a vent hole (not shown), the vent holes of the light guiding elements 18*b* are communicated with the receiving cavity cooperatively defined by the first flexible housing 10*b* and the second flexible housing 20*b*. When the air is filled into the receiving cavity, the light guide element 18*b* is also filled with air to achieve a light guide effect.

In at least one embodiment, the light guide portion 18*b* has a circle shape, a polygon shape, or an irregular shape, etc.

In at least one embodiment, the outer surface of the first flexible housing 10*b* and/or the outer surface of the second flexible housing 20*b* include a plurality of light guiding elements 18*b*. The light guiding elements 18*b* are arranged at intervals on the outer surface of the first flexible housing 10*b* and/or the outer surface of the second flexible housing 20*b*.

In the technical solutions of the present disclosure, the outer surface of the first flexible housing 10*b* and/or the outer surface of the second flexible housing 20*b* include at least one light guiding element 18*b*. The at least one light guiding element 18*b* is configured to condense or diffuse light, to narrow or expand the illumination area.

Figure 13:
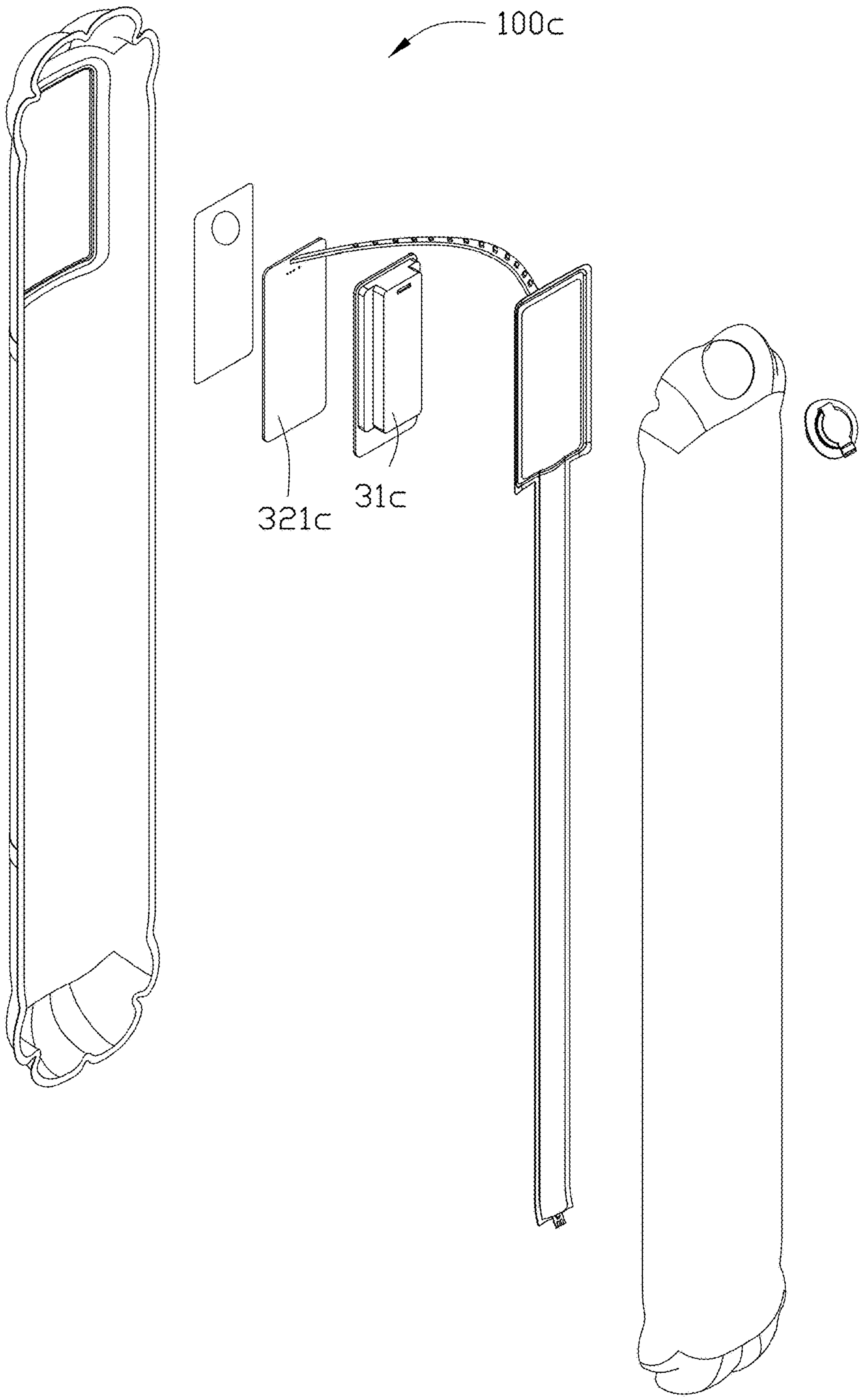
FIG. 13 is a structural schematic view of an inflatable lamp according to a third embodiment of the present disclosure.

Referring to FIG. 13, the present disclosure provides an inflatable lamp 100*c* according to a third embodiment. The inflatable lamp 100*c* of the third embodiment is similar in structure to the inflatable lamp 100*a* of the first embodiment, and the difference between the inflatable lamp 100*c* of the third embodiment and the inflatable lamp 100*a* of the first embodiment includes: the power supply includes solar panel 321*c* received in a mounting element 31*c*.

Figure 14:
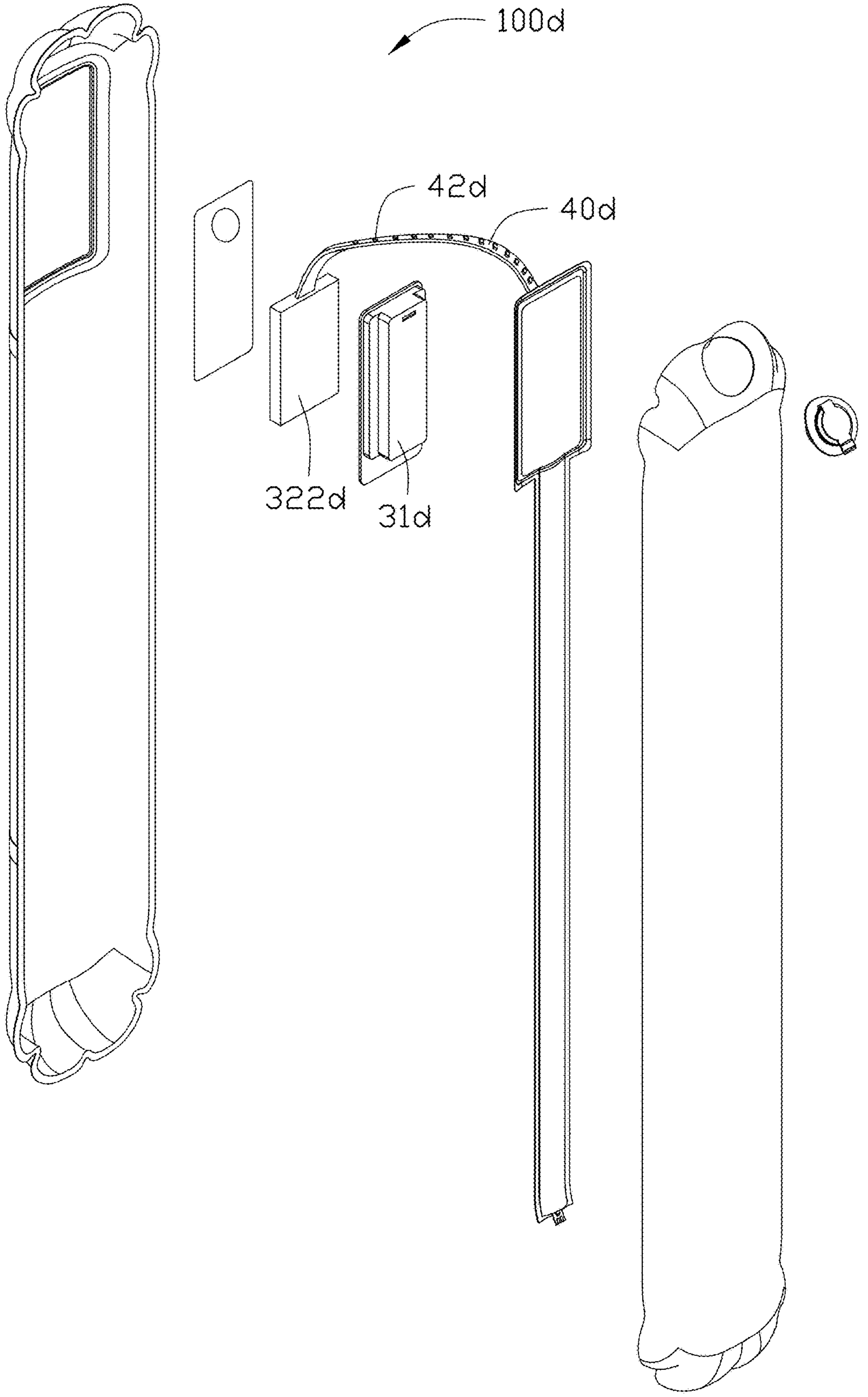
FIG. 14 is a structural schematic view of an inflatable lamp according to a fourth embodiment of the present disclosure

Referring to FIG. 14, the present disclosure provides an inflatable lamp 100*d* according to a fourth embodiment. The inflatable lamp 100*d* of the fourth embodiment is similar in structure to the inflatable lamp 100*a* of the first embodiment, and the differences between the inflatable lamp 100*d* of the fourth embodiment and the inflatable lamp 100*a* of the first embodiment include: the power supply is battery 322*d*, one end of the light strip 40*d* is arranged on a surface of a mounting element 31*d* opposite to the battery 322*d*, and electrically connected to the battery 322*d*.

In at least one embodiment, the battery 322*d* is a rechargeable battery.

In at least one embodiment, the mounting element 31*d* is at least partially transparent.

In at least one embodiment, the light strip 40*d* includes a connecting end 42*d*, the connecting end 42*d* is arranged on the surface of the mounting element 31*d* opposite to the battery 322*d*, and electrically connected to the battery 322*d*.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, and to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present disclosure.

What is claimed is:

1. An inflatable lighting device, comprising:

a flexible housing, comprising a first surface and a second surface connected to the first surface, the first surface and the second surface cooperatively defining a receiving cavity, wherein the receiving cavity is inflatable;

a light assembly, received in the receiving cavity, the light assembly comprises a plurality of light elements and a light base, the plurality of light elements are arranged on the light base; and a sealing assembly, received in the receiving cavity, wherein the sealing assembly is connected to the inner side of the first surface; wherein, the plurality of light elements and the light base are disposed between the sealing assembly and the first surface.

2. The inflatable lighting device of claim 1, wherein the second surface is substantially transparent or translucent.

3. The inflatable lighting device of claim 1, further comprising a power supply assembly, wherein the power supply assembly is arranged on the first surface and electrically connected with the plurality of light elements and the light base.

4. The inflatable lighting device of claim 3, wherein the sealing assembly comprises:

a first sealing part, configured to airtightly seal the power supply assembly between the inner side of the first surface and the first sealing part, the first sealing part is directly connected to the inner side of the first surface; and a second sealing part, connected with the first sealing part, the second sealing part is configured to airtightly seal the plurality of light elements and the light base between the inner side of the first surface and the second sealing part.

5. The inflatable lighting device of claim 4, wherein the power supply assembly comprises:

a mounting element, received in the receiving cavity; and a power supply element, received in the mounting element, and the plurality of light elements and the light base are electrically connected with the power supply element.

6. The inflatable lighting device of claim 5, wherein, the power supply element comprises a solar panel and a battery, the solar panel is configured to generate electric energy, and the battery is configured to store the electric energy.

7. The inflatable lighting device of claim 6, wherein, the mounting element defines a first receiving groove and a second receiving groove communicating with the first receiving groove;

the battery is received in the first receiving groove, and the solar panel is received in the second receiving groove.

8. The inflatable lighting device of claim 7, wherein, the second receiving groove is formed by two opposite groove walls of the first receiving groove being recessed in opposite directions.

9. The inflatable lighting device of claim 7, wherein, the battery is disposed between the solar panel and a groove bottom of the first receiving groove of the mounting element.

10. The inflatable lighting device of claim 9, wherein, the mounting element defines a notch that extends through the groove bottom, and an end of the light assembly is arranged on a surface of the mounting element away from the solar panel and is electrically connected to the solar panel through the notch.

11. The inflatable lighting device of claim 7, wherein, the first sealing part defines a first accommodating groove and a second accommodating groove communicated with the first accommodating groove; and walls of the first receiving groove are received in the first accommodating groove, and walls of the second receiving groove are received in the second accommodating groove.

12. The inflatable lighting device of claim 11, wherein, the second accommodating groove is formed by two groove walls of the first accommodating groove being recessed in opposite directions.

13. The inflatable lighting device of claim 5, wherein the sealing assembly is configured to airtightly seal and cover the plurality of light elements and the light base and the mounting element.

14. The inflatable lighting device of claim 5, wherein the flexible housing defines a mounting hole, the mounting element is arranged on a portion of the flexible housing corresponded to the mounting hole, and received in the receiving cavity;

the sealing assembly further comprises:

a sealing element facing the sealing assembly, the sealing element is sealingly connected with the first surface, and configured to airtightly seal and cover the mounting element and the power supply, a peripheral of the sealing element is sealed with an outer side of the first surface.

15. The inflatable lighting device of claim 5, wherein the mounting element is at least partially transparent.

16. The inflatable lighting device of claim 1, wherein the inflatable device further comprises at least one hanger arranged on an outer surface of the first surface or an outer surface of the second surface.

17. The inflatable lighting device of claim 1, wherein the inflatable device further comprises at least one light guiding element arranged on the first surface or an outer surface of the second surface.

18. The inflatable lighting device of claim 1, wherein the first surface or an outer surface of the second surface defines at least one vent hole, and the inflatable device further comprises at least one sealing plug configured to open or seal the vent hole.

19. The inflatable lighting device of claim 1, wherein at least one of the first surface and the second surface is substantially transparent or translucent, allowing light emitted from light-emitting surfaces of the plurality of light elements to pass through.

20. The inflatable lighting device of claim 5, wherein, a part of the light assembly is mounted on the mounting element, and another part of the light assembly is mounted on the first surface.

* * * * *